US008801982B2

(12) United States Patent
Cassart et al.

(10) Patent No.: US 8,801,982 B2
(45) Date of Patent: Aug. 12, 2014

(54) METHOD TO START-UP A PROCESS TO MAKE EXPANDABLE VINYL AROMATIC POLYMERS

(75) Inventors: Michel Cassart, Braine-l'Alleud (BE); Francis Couget, Stiring-Wendel (FR); Elena Prats, Barcelona (ES)

(73) Assignee: Total Research & Technology Feluy, Seneffe (Feluy) (BE)

( * ) Notice: Subject to any disclaimer, the term of this patent is extended or adjusted under 35 U.S.C. 154(b) by 0 days.

(21) Appl. No.: 13/522,742

(22) PCT Filed: Jan. 27, 2011

(86) PCT No.: PCT/EP2011/051153
§ 371 (c)(1),
(2), (4) Date: Sep. 28, 2012

(87) PCT Pub. No.: WO2011/092250
PCT Pub. Date: Aug. 4, 2011

(65) Prior Publication Data
US 2013/0203876 A1 Aug. 8, 2013

(30) Foreign Application Priority Data

Jan. 28, 2010 (EP) .................................... 10151984

(51) Int. Cl.
*C08J 9/16* (2006.01)
(52) U.S. Cl.
USPC ......... 264/37.29; 264/37.32; 264/50; 264/51; 264/141; 521/40; 521/60
(58) Field of Classification Search
USPC ............. 264/141, 142, 143; 425/67, 311, 313
See application file for complete search history.

(56) References Cited

U.S. PATENT DOCUMENTS

| 4,606,873 | A | | 8/1986 | Biglione et al. | |
|---|---|---|---|---|---|
| 5,235,385 | A | | 8/1993 | Johnson | |
| 5,238,385 | A | * | 8/1993 | Johnson | 425/183 |
| 5,525,052 | A | | 6/1996 | Czarnetzki et al. | |
| 5,573,790 | A | * | 11/1996 | Wehtje et al. | 425/404 |
| 5,876,646 | A | | 3/1999 | Yoshida et al. | |
| 6,783,710 | B1 | | 8/2004 | Walder | |
| 2005/0156344 | A1 | | 7/2005 | Dietzen et al. | |
| 2006/0211780 | A1 | | 9/2006 | Passaplan et al. | |
| 2008/0203597 | A1 | | 8/2008 | Rogov et al. | |
| 2009/0091054 | A1 | | 4/2009 | Murb | |
| 2009/0108480 | A1 | | 4/2009 | Schmaus et al. | |
| 2009/0115091 | A1 | | 5/2009 | Eloo et al. | |
| 2010/0036044 | A1 | | 2/2010 | Tomioka et al. | |
| 2010/0130627 | A1 | | 5/2010 | Casalini et al. | |
| 2012/0267818 | A1 | * | 10/2012 | Eloo et al. | 264/141 |

FOREIGN PATENT DOCUMENTS

| EP | 2062935 A2 | 11/2008 |
|---|---|---|
| EP | 2062935 A2 * | 5/2009 |
| WO | WO 2006087179 A1 * | 8/2006 |
| WO | 2009052898 A1 | 4/2009 |

* cited by examiner

Primary Examiner — Randy Gulakowski
Assistant Examiner — Christina Wales

(57) ABSTRACT

A method for producing expandable pellets can include introducing a vinyl aromatic polymer and an expandable agent to a pelletizer (L). The pelletizer (L) can have a die plate having a holes of large diameter. During the start-up of the production of the expandable pellets, pellets can be produced in the pelletizer (L). When the polymer flow rate is in the operating range of the pelletizer (S), the introduction of the vinyl aromatic polymer and the expandable agent can be switched from the pelletizer (L) to the pelletizer (S). The pelletizer (S) can be operated at conditions effective to produce the expandable pellets. The pelletizer (S) can have a die plate having holes of small diameter. The expandable pellets can be recovered from the pelletizer (S), and the pellets can be recovered from the pelletizer (L).

13 Claims, No Drawings

US 8,801,982 B2

METHOD TO START-UP A PROCESS TO MAKE EXPANDABLE VINYL AROMATIC POLYMERS

CROSS-REFERENCE TO RELATED APPLICATIONS

This application claims the benefit of PCT/EP2011/051153, filed Jan. 27, 2011, which claims priority from EP 10151984.1, filed Jan. 28, 2010.

FIELD OF THE INVENTION

The present invention relates to a method to start-up a process to make expandable vinyl aromatic polymers. Expandable vinyl aromatic polymers, and among these, in particular, expandable polystyrene (EPS), are known products which have been used for a long time for preparing expanded articles which can be adopted in various applicative fields, among which one of the most important is the field of heat insulation. These expanded products are obtained by swelling in a closed mould beads of expandable polymer impregnated with a gas and molding the swollen particles contained inside the mould by means of the contemporaneous effect of pressure and temperature. The swelling of the particles is generally effected with vapour, or another gas, maintained at a temperature slightly higher than the glass transition temperature (Tg) of the polymer.

A particular applicative field of expanded polystyrene is that of thermal insulation in the building industry where it is generally used in the form of flat sheets. The flat expanded polystyrene sheets are normally used with a density of about 10 to 40 g/l to obtain the optimum balance between thermal conductivity and other properties.

BACKGROUND OF THE INVENTION

The term "expandable beads (or pellets) based on vinyl aromatic polymers" as used in the present description and claims, means vinyl aromatic polymers in the form of granules, containing an expanding system and optionally other additives.

These expandable thermoplastic polymers in the form of granules are particularly used, after expansion and moulding, in the production of household appliances or other industrial equipment, in packaging and thermal insulation in the building industry, due to their thermo-insulating properties. Thermoplastic vinyl aromatic polymers such as polystyrene can be made expandable by incorporating an expandable agent in the polymeric matrix. Typical expanding agents for vinyl aromatic polymers include at least one liquid hydrocarbon containing from 3 to 7 carbon atoms, a halogenated hydrocarbon, carbon dioxide or water. The quantity of expanding agent usually ranges from 2 to 15% by weight. Expandable polymers are produced in general as beads or granules which, under the action of heat, supplied, for example, by steam, are first expanded until a desired density is reached and, after a certain aging period, are sintered in closed moulds to produce blocks or the desired final products.

The making of such expandable beads has already been described in EP 126459, US 2006 211780, US 2005 156344, U.S. Pat. No. 6,783,710 and WO 2008 141766.

The present invention relates to a process in which an expandable agent and optionally additives are incorporated into the vinyl aromatic polymer in the molten state and then said vinyl aromatic polymer comprising the expandable agent and optionally additives is extruded through the die plate and cut to get pellets. Generally the die plate is incorporated in a machinery called "granulator" or "pelletizer" comprising, means to introduce the molten vinyl aromatic polymer comprising the expandable agent and optionally additives,
the die plate,
cutting means to make the pellets,
means to cool and recover the pellets, e.g., circulating water and
means to separate the pellets from the water.

WO 2008 141766 describes such a process for the continuous production of granules based on thermoplastic polymers comprising at least one expandable agent and, optionally, other polymers or additives, among which inorganic pigments insoluble in the Polymeric matrix, wherein a first main stream is prepared, in the molten state, and a second stream in the molten State, which englobes the additives and which is added to the first stream. The mixture is extruded through a die which is cooled by means of water jets from nozzles positioned behind the cutting blades.

US 2009 0108480 relates to a process and an apparatus for pelletizing polymer melts comprising blowing agent in a pelletizing chamber through which a liquid flows, its pressure being above the ambient pressure. Another term generally used for the pelletizing process is underwater pelletizing, since water is generally used as liquid flowing through the pelletizing chamber. By way of example, the underwater pelletizing process is used when pellets are produced from plastics comprising blowing agent. The elevated pressure in the pelletizing chamber ensures that the plastic does not expand during the pelletizing process With plastics comprising blowing agent, it is generally the case that blowing agents are present in the polymer melt from which the pellets are manufactured. In said prior art in a first step, the polymer melt is injected into the pelletizing chamber, in a second step the polymer melt is cut via a cutting apparatus into individual pellets and, in a third step, the pellets produced in the pelletizing process are discharged with the liquid from the pelletizing chamber and are then isolated from the liquid. This process also comprises at least one of the following steps: (a) comminution of agglomerates or of pellets which exceed a prescribed maximum size, in a comminuting machine downstream of the pelletizing chamber or in a comminuting unit downstream of the cutting apparatus, (b) depressurization of the liquid in a depressurizing machine, (c) depressurization of the liquid in a throttle apparatus, where there is, upstream of the throttle apparatus, a pressure-equalizing container, (d) isolation of the pellets from the liquid, without any prior depressurization of the liquid with the pellets which it comprises.

US 2009 0091054 relates to a device for producing pellets from a plastic melt by extrusion, comprising a perforated plate from which the plastic melt is extruded at a pressure above the ambient pressure; a process chamber into which the plastic melt is extruded; a chopping device for chopping strands of the plastic melt extruded from the perforated plate into individual granules, the process chamber being filled with a process fluid; and a pumping device which supplies the process fluid to the process chamber at a pressure above the ambient pressure, the pressure of the process fluid with the therein contained granules being reduced downstream of the process chamber. According to the invention, an energy converter is provided downstream of the process chamber, wherein said energy converter extracts at least some of the pressure energy from the process fluid with the therein contained granules, reduces the pressure of the process fluid with the therein contained granules and converts at least some of the extracted energy into a reusable form of energy. The invention further relates to a corresponding process for producing pellets from a plastic melt by extrusion and also to a corresponding application.

US 2005 0156344 describes a process for the preparation of expandable styrene polymers having a molecular weight $\overline{Mw}$ of greater than 170000 g/mol, which comprises conveying a blowing agent-containing styrene polymer melt having a temperature of at least 120° C. through a die plate with holes whose diameter at the die exit is at most 1.5 mm, and subsequently granulating the extrudate.

In the prior art nothing is mentioned about the start-up, the shut down and other unstable phases of the process. In such a process the die plate comprises a plurality of small holes having a diameter typically in the range 0.5 to 1.9 mm diameter. Adjusting the introduction of the expandable agent and the optional additives takes some time, during said time the recovered pellets are off specifications. Moreover such a die plate needs to be operated close to the nominal capacity and typically not less than 75%, preferably not less than 80% of said nominal capacity. Until this operating range is not reached the recovered pellets are off specifications.

As regards a die plate having large holes it can be operated in a broader range compared to a die plate having small holes but it is not used to produce expandable vinyl aromatic polymer pellets comprising the expandable agent and optionally additives. The obtained pellets contain the expandable agent and optionally additives but they cannot be expanded properly.

It has been discovered to start-up the production on a die plate having large holes typically in the range 2 to 5 mm diameter and then,
- as soon as the flow rate is close to the nominal capacity of the die plate having the small holes and
- provided the proportion of expandable agent and optional additives are in the specifications,
- to switch to said die plate having the small holes.

The pellets produced during the start-up with the die plate having the large holes are kept and further can be sold as such or recycled in the process e.g., by a side extruder and mixed with the molten vinyl aromatic polymer comprising the expandable agent and optionally additives.

During normal operation troubles can happen in the introduction of the expanding agent and/or the optional additives or in any equipment or even an equipment needs maintenance. The stream of molten vinyl aromatic polymer is switched from the pelletizer(s) having small holes to one or more pelletizers having large holes. When the troubles are over, the stream of molten vinyl aromatic polymer comprising the expandable agent and optionally additives is switched from the pelletizers having large holes to the pelletizers having small holes. As explained above the pellets produced during the troubles with the die plate having the large holes are kept and further can be sold as such or recycled in the process e.g., by a side extruder and mixed with the molten vinyl aromatic polymer comprising the expandable agent and optionally additives.

BRIEF SUMMARY OF THE INVENTION

The present invention is a method to start-up a process to make expandable vinyl aromatic polymer pellets comprising,
a) providing a pelletizer (S) containing means to introduce the molten vinyl aromatic polymer comprising the expandable agent and optionally additives, a die plate having a plurality of holes of small diameter, typically in the range 0.5 to 1.9 mm and cutting means to make pellets, b) providing a pelletizer (L) containing means to introduce the molten vinyl aromatic polymer comprising the expandable agent and optionally additives, a die plate having a plurality of holes of large diameter, typically in the range 2 to 5 mm and cutting means to make pellets, c) sending the expandable vinyl aromatic polymer pellets comprising an expandable agent and optionally additives to the pelletizer (L) until the polymer flow rate is in the operating range of the pelletizer (S) and provided the proportion of expandable agent and optional additives are in the specifications, d) switching the molten vinyl aromatic polymer stream comprising the expandable agent and optionally additives to the pelletizer (S) and operating said pelletizer (S) at conditions effective to produce expandable vinyl aromatic polymer pellets, e) recovering from pelletizer (S) the expandable vinyl aromatic polymer pellets, f) recovering the pellets produced at step c) for optional subsequent recycling in the molten state at step d).

Advantageously in the pelletizer (S) the holes diameter of the die plate are in the range 0.5 to 1.5 mm, preferably in the range 0.8 to 1.4.

Advantageously in the pelletizer (L) the holes diameter of the die plate are in the range 3 to 5 mm, preferably in the range 3 to 4.

In an embodiment while the pelletizer (S) is in production the pelletizer (L) is used to produce non expandable vinyl aromatic polymer (e.g. crystal PS or HiPS),
- said pelletizer (L) can be fed by the melted vinyl aromatic polymer going through at least a part of the apparatus designed to introduce the expanding agent and the optional additives but without said introduction or,
- said pelletizer (L) can be fed essentially directly by the vinyl aromatic polymer source, e.g., the devolatilizer of a polymerization unit without going through the apparatus designed to introduce the expanding agent and the optional additives.

In another embodiment pelletizer (S) can be used to make non expandable vinyl aromatic polymer (e.g. crystal PS or HiPS). As explained above for the pelletizer (L) said pelletizer (S) can be fed by the melted vinyl aromatic polymer going through at least a part of the apparatus designed to introduce the expanding agent and the optional additives but without said introduction or directly from the vinyl aromatic polymer source.

This crystal PS and HiPS can be sold as such and have not to be recycled.

In another embodiment while the pelletizer (S) is in production and troubles happen in the introduction of the expanding agent and/or the optional additives or in any equipment or even an equipment needs maintenance the stream of molten vinyl aromatic polymer is switched from the pelletizer (S) to one or more pelletizers (L). When the troubles are over, the stream of molten vinyl aromatic polymer comprising the expandable agent and optionally additives is switched from the pelletizer (L) to the pelletizer (S).

When the specifications are changed (there are various types of expandable pellets according to the customers and end uses), as above the stream of molten vinyl aromatic polymer is switched from the pelletizer (S) to one or more pelletizers (L), then as soon as the polymer flow rate is in the operating range of the pelletizer (S) and provided the proportion of expandable agent and optional additives are in the specifications, the production is switched to the pelletizer (S).

As explained above the pellets produced with the pelletizer (L) during the troubles and/or the change of specifications can be sold as such or optionally recycled in the process e.g., by a side extruder and mixed with the molten vinyl aromatic polymer comprising the expandable agent and optionally additives. The recycled pellets can be used to predisperse some additives and facilitate the dispersion in the final products.

In an embodiment while the pelletizer (S) is in production the die plate of the pelletizer (L) having a plurality of holes of large diameter is removed and replaced by a die plate having a plurality of holes of small diameter to convert said pelletizer (L) into a pelletizer (S) capable to produce expandable vinyl aromatic polymer pellets. By way of example said established pelletizer (S) is used during maintenance of the other pelletizer (S).

It is hereabove referred to one pelletizer (L) and one pelletizer (S), but it could be one or more pelletizers (L) and 2 or more pelletizers (S) provided the flow rates are in accordance.

The present invention is also any combination of two or more of the previous points:
- use of the pelletizer (L) to start-up the production,
- use of the pelletizer (L) to produce non expandable pellets (e.g. crystal PS or HiPS) with or without a by pass connecting directly to the vinyl aromatic polymer source,
- switch to the pelletizer (L) when troubles happen in the introduction of the expanding agent and/or the optional additives or in any equipment or even an equipment needs maintenance,
- the specifications are changed to produce another type of expandable pellet,
- replacement of the die.

DETAILED DESCRIPTION OF THE INVENTION

As regards the vinyl aromatic polymer, mention may be made of:
polystyrene, elastomer-modified polystyrene,
copolymers of styrene and acrylonitrile (SAN), elastomer-modified SAN, in particular ABS, which is obtained, for example, by grafting (graft polymerization) of styrene and acrylonitrile on a backbone of polybutadiene or of butadiene-acrylonitrile copolymer,
mixtures of SAN and ABS,
copolymers with styrene blocks and blocks made of butadiene or isoprene or of a mixture butadiene/isoprene, these block copolymers can be linear blocks copolymers or star blocks copolymers, they can be hydrogenated and/or fonctionnalized. These copolymers are described in ULLMANN'S ENCYCLOPEDIA OF INDUSTRIAL CHEMISTRY, fifth edition (1995) Vol A26, pages 655-659, They are sold by Total Petrochemicals under the trade mark Finaclear®, by BASF under the trade mark Styrolux®, under the trade mark K-Resin® by Chevron Phillips Chemical,
SBR (Styrene butadiene rubber),
Possible examples of the abovementioned elastomers are EPR (the abbreviation for ethylene-propylene rubber or ethylene-propylene elastomer), EPDM (the abbreviation for ethylene-propylene-diene rubber or ethylene-propylene-diene elastomer), polybutadiene, acrylonitrile-butadiene copolymer, polyisoprene, isoprene-acrylonitrile copolymer and copolymers with styrene blocks and blocks made of butadiene or isoprene or of a mixture butadiene/isoprene. These block copolymers can be linear blocks copolymers or star blocks copolymers, they can be hydrogenated and/or fonctionnalized (see above).

In the above vinyl aromatic polymer just mentioned, part of the styrene may be replaced by unsaturated monomers copolymerizable with styrene, for example alpha-methylstyrene or (meth)acrylates, Other examples of styrene copolymers which may be mentioned are chloropolystyrene, poly-alpha-methylstyrene, styrene-chlorostyrene copolymers, styrene-propylene copolymers, styrenebutadiene copolymers, styrene-isoprene copolymers, styrene-vinyl chloride copolymers, styrene-vinyl acetate copolymers, styrene-alkyl acrylate copolymers (methyl, ethyl, butyl, octyl, phenyl acrylate), styrene-alkyl methacrylate copolymers (methyl, ethyl, butyl, phenyl methacrylate), styrene methyl chloroacrylate copolymers and styrene-acrylonitrile-alkyl acrylate copolymers.

In a specific embodiment the vinyl aromatic polymer comprises:
i) from 60 to 100 weight % of one or more $C_{8-12}$ vinyl aromatic monomers; and
ii) from 0 to 40 weight % of one or more monomers selected from the group consisting of $C_{1-4}$ alkyl esters of acrylic or methacrylic acid and acrylonitrile and methacrylonitrile; which polymer may be grafted onto or occluded within from 0 to 20 weight % of one or more rubbery polymers.

By way of example rubbery polymers can be selected from the group consisting of:
a) co- and homopolymers of $C_{4-6}$ conjugated diolefins,
b) copolymers comprising from 60 to 85 weight % of one or more $C_{4-6}$ conjugated diolefins and from 15 to 40 weight % of a monomer selected from the group consisting of acrylonitrile and methacrylonitrile and
c) copolymers comprising from 20 to 60, preferably from 40 to 50 weight % of one or more $C_{8-12}$ vinyl aromatic monomers which are unsubstituted or substituted by a $C_{1-4}$ alkyl radical and from 60 to 40, preferably from 60 to 50 weight % of one or more monomers selected from the group consisting of $C_{4-6}$ conjugated diolefins.

The rubber may be prepared by a number of methods, preferably by emulsion or solution polymerization. These process are well known to those skilled in the art. The vinyl aromatic polymers may be prepared by a number of methods. This process is well known to those skilled in the art.

If present, preferably the rubber is present in an amount from about 3 to 10 weight %. Polybutadiene is a particularly useful rubber.

In the specific embodiment in which the vinyl aromatic polymer is polystyrene, it could be a crystal polystyrene or a rubber modified polystyrene. The rubber modified polystyrene is called HIPS (High Impact Polystyrene). The process for making HIPS is well known to those skilled in the art. The rubber is "dissolved" in the styrene monomer (actually the rubber is infinitely swollen with the monomer). This results in two co-continuous phases. The resulting "solution" is fed to a reactor and polymerized typically under shear. When the degree of polymerization is about equal to the weight % of rubber in the system it inverts (e.g. the styrene/styrene polymer phase becomes continuous and the rubber phase becomes discontinuous. After phase inversion the polymer is finished in a manner essentially similar to that for finishing polystyrene. The polymer is prepared using conventional bulk, solution, or suspension polymerization techniques.

The vinyl aromatic polymers of the present invention may be co- or homopolymers of $C_{8-12}$ vinyl aromatic monomers. Some vinyl aromatic monomers may be selected from the group consisting of styrene, alpha methyl styrene and para methyl styrene. Preferably the vinyl aromatic monomer is styrene. The vinyl aromatic polymer may be a copolymer comprising from 60 to 100 weight % of one or more $C_{8-12}$ vinyl aromatic monomers; and from 0 to 40 weight % of one or more monomers selected from the group consisting of $C_{1-4}$ alkyl esters of acrylic or methacrylic acid and acrylonitrile and methacrylonitrile. Suitable esters of acrylic and methacrylic acid include methyl acrylate, ethyl acrylate, butyl acrylate, methyl methacrylate, ethyl methacrylate and butyl methacrylate. The vinyl aromatic polymers of the present invention may be rubber modified.

Advantageously the vinyl aromatic polymer is a monovinylaromatic polymer.

As regards the expanding agent, it is selected from aliphatic or cyclo-aliphatic hydrocarbons containing from 3 to 6 carbon atoms such as n-pentane, iso-pentane, cyclopentane or blends thereof; halogenated derivatives of aliphatic hydrocarbons containing from 1 to 3 carbon atoms, such as, for example, dichlorodifluoromethane, 1,2,2-trifluoroethane, 1,1,2-trifluoroethane; carbon dioxide and water.

As regards the additives, one can cite any material capable to reduce the thermal conductivity of the expanded vinyl aromatic polymer. One can cite carbon black, graphite, mica, talc, silica, titanium dioxide and barium sulfate. One can cite carbon black with a surface area, measured according to ASTM D-3037/89, ranging from 5 to 200 m2/g.

The expandable vinyl aromatic polymer may also comprise at least one additive selected from flame retardants, nucleating agents, plasticizers and agents which facilitate the demoulding of the moulded and expanded articles. In particular it may comprise at least one flame retardant selected in particular from halogenated hydrocarbons, preferably brominated hydrocarbons, in particular C6 to C12 hydrocarbons, such as hexabromocyclohexane, pentabromomonochlorocyclohexane or hexabromocyclododecane or brominated flame-retardant grafted on polymer chains in an amount which can range from 0.05 to 2 parts, preferably from 0.1 to 1.5 parts, by weight, per 100 parts by weight of the vinyl aromatic polymer. The composition may further comprise at least one nucleating agent selected in particular from synthetic waxes, in particular Fischer-Tropsch waxes and polyolefin waxes such as polyethylene waxes or polypropylene waxes, in an amount which can range from 0.05 to 1 part, preferably from 0.1 to 0.5 part, by weight per 100 parts by weight of the vinyl aromatic polymer. The composition may likewise comprise at least one plasticizer, selected in particular from mineral oils and petroleum waxes such as paraffin waxes, in an amount which can range from 0.1 to 1 part, preferably from 0.1 to 0.8 part, by weight per 100 parts by weight of the vinyl aromatic polymer. The composition may additionally comprise at least one agent which facilitates the demoulding of the moulded and expanded articles, selected in particular from inorganic salts and esters of stearic acid, such as glycerol mono-, di or tristearates and zinc stearate, calcium stearate or magnesium stearate, in an amount which can range from 0.05 to 1 part, preferably from 0.1 to 0.6 part, by weight per 100 parts by weight of the vinyl aromatic polymer.

As regards the process to make said expandable polymer, it is carried out by mixing the vinyl aromatic polymer in the melted state with the expanding agent or agents and optionally the additives. In an advantageous embodiment the mixing is carried out in a chamber equipped with at least one stirring means and under temperature and pressure conditions which are capable of preventing expansion of the composition, preferably in an extruder, in particular a single-screw or twin-screw extruder, or in one or more static mixers at a temperature greater than the glass transition temperature of the polymer, in particular a temperature ranging from 120 to 250° C. and under an absolute pressure ranging from 0.1 to 10 MPa. Such processes are described in WO 2008 041766, WO 2009 052898, EP 2062935, US 2008 203597 and U.S. Pat. No. 6,783,710 the content of which is incorporated in the present application.

According to an embodiment the present invention relates to a process for preparing in mass and in continuous, expandable vinyl aromatic polymers, which comprises the following steps in series: (i) feeding the vinyl aromatic polymer, as described above, to an extruder, optionally together with fillers, (ii) heating the vinyl aromatic polymer to a temperature higher than the relative melting point; (iii) injecting the expanding agent and possible additives into the molten polymer before extrusion through a die; and (iv) forming expandable pellets, through a die, with an average diameter ranging advantageously from 0.5 to 1.9 mm.

According to a specific embodiment, the process includes the incorporation, in a first polymeric stream (hereinafter referred to as "main stream"), of a second polymeric stream (hereinafter referred to as "side stream") containing the expanding system and additives. Alternatively, the expanding system can be directly incorporated into the main stream.

The resulting composition, in the molten state, is then homogenized and finely sieved by one or more filtering steps which either remove or disgregate the polymeric aggregates and the non-dispersed inorganic fillers. The polymeric composite product is then extruded through a die and granulated.

According to a preferred embodiment, the polymer forming the main polymeric stream is taken in the molten state from a continuous polymerization process. The polymer, coming from one or more polymerization steps, is typically removed from the possible dilution solvent, the non-reacted monomer and the oligomers, in a section called "devolatilization".

The so purified polymer is used directly, in the molten state, as the main polymeric stream of the process of the present invention. For this purpose, the polymer coming from the devolatilizer preferably contains no more than 2,000 ppm of monomers and 8,000 ppm of dimers, trimers and oligomers, so as to prevent damage to the structure of the foam obtained after expansion of the resulting expandable particle polymers.

According to an alternative embodiment, the polymer used as the main stream is in the shape of pellets. Said pellets are melted in a suitable device (a single-screw or twin-screw extruder, for example).

In both embodiments, the molten polymeric material is pressurized and then pushed into the subsequent process section, by means of any suitable device, typically a gear pump.

Advantageously, the additives are incorporated in a secondary polymer stream which subsequently joins, in the molten state, the main polymer stream.

In a preferred embodiment, the additives are metered in a twin-screw extruder together with the granules of the polymer. Expediently, the extruder, after the melting section, contains mixing elements which allow a better distribution of the additives in the polymeric phase. The mass fraction of the polymeric phase must be at least equal to 20%, more preferably at least 40% with respect to the content of the polymer in the side fraction, to process the resulting molten mass successfully.

Advantageously, the extruder contains a degassing phase to remove possible solvents contained in the additive blend.

The temperature of the molten stream must be kept within a prefixed range. Typically, the minimum temperature is equal to the maximum temperature selected among the solidification temperatures of the molten components, plus 20° C., whereas the maximum temperature is the same plus 150° C.

Optionally, before entering the extruder, the additives and polymer in granules can be premixed in a suitable mixer for solids, in order to favour a homogeneous distribution of the components. The preferred device for this operation is a screw mixer.

When liquid or gaseous additives are used, an efficient means to incorporate them is to inject the same into a side feeding point of said extruder, located down stream the melting and degassing section.

The solid additives which do not melt at the extrusion temperature of the molten stream must consist of fine particles. In particular, considering the population of non-meltable particles, the "d90", i.e. the dimension under which lies 90% of the population, typically must not be larger than half of the diameter of the holes of the die plate.

Preferably, d90 must not be larger than 1/4th of the diameter of the die holes. Dimension means the diameter as calculated by means of laser diffraction measurement on the non-meltable materials.

The recycling of the pellets produced on the pelletizer (L) during the start up or during the troubles in the introduction of the expanding agent and/or the optional additives or in any equipment or even when an equipment needs maintenance can be made by any means. Said pellets can be melted in a suitable device (a single-screw or twin-screw extruder, for example) and then mixed with the molten vinyl aromatic polymer comprising the expandable agent and optionally additives feeding the pelletizer (S).

The pellets produced with the pelletizer (L) during start-up, during the troubles and/or the change of specifications are used to incorporate Flame Retardant and/or one or more additives and ensuring a good dispersion of said Flame Retardant and/or one or more additives.

The recycled pellets can be premixed with the flame retardant additive, flame retardant synergist such as peroxide and other specific additives prior to the introduction on the main stream to facilitate and ensure a good dispersion of those additives in the polymer, and in the same time avoiding or decreasing the need of virgin polymer.

As regards the removal of the die plate to be replaced by a die plate having small holes, this is an operation known to the man skilled in the art.

The expandable beads (pellets) produced are subjected to pre-treatment generally applied to conventional expandable beads and which essentially consists in:

1. coating the beads with a liquid antistatic agent such as amines, tertiary ethoxylated alkylamines, ethylene oxide-propylene oxide copolymers, etc. The purpose of this agent is to facilitate both the adhesion of the coatings 2. applying the "coating" to the above beads, said coating essentially consisting of a mixture of mono-, di- and triesters of glycerin (or other alcohols) with fatty acids and of metallic stearates such as zinc and/or magnesium stearate.

The expandable vinyl aromatic polymer pellets are used to make expanded articles, in particular insulation boards.

In an embodiment the moulded and expanded article is produced by a process comprising the following steps:

(i) a step of pre-expansion, by contacting and mixing the composition, which is in the form in particular of expandable pellets with water vapour, in particular in a stirred tank, under pressure and temperature conditions capable of forming expanded particles or expanded beads having in particular a bulk density ranging from 5 to 200 kg/m3, preferably from 5 to 100 kg/m3 and in particular from 5 to 50 kg/m3, (ii) a step of stabilizing the particles or beads thus expanded, by contacting them with ambient air, and (iii) a step of moulding the particles or beads thus stabilized, by introducing them into a mould and by heating the mould so as to weld the particles or beads to one another and so to produce a moulded and expanded article having in particular the desired bulk density and, preferably a bulk density substantially identical to that of the expanded particles or expanded beads obtained in step (i).

What is claimed:

1. A method for production of expandable vinyl aromatic polymer pellets comprising:
   during start-up of the production of the expandable vinyl aromatic polymer pellets:
      introducing a vinyl aromatic polymer, an expandable agent, and optionally additives to a pelletizer (L) comprising a first die plate having a plurality of holes of large diameter and a first cutting means; and
      producing pellets in the pelletizer (L) until a polymer flow rate is in an operating range of a pelletizer (S);
   when the polymer flow rate is in the operating range of the pelletizer (S), switching the introduction of the vinyl aromatic polymer, the expandable agent, and optionally the additives from the pelletizer (L) to the pelletizer (S), and operating the pelletizer (S) at conditions effective to produce the expandable vinyl aromatic polymer pellets, wherein the pelletizer (S) comprises a second die plate having a plurality of holes of small diameter and a second cutting means;
   recovering the expandable vinyl aromatic polymer pellets from the pelletizer (S);
   recovering the pellets from the pelletizer (L); and
   recycling the pellets produced by the pelletizer (L), wherein the recycling of the pellets produced by the pelletizer (L) comprises:
      introducing the pellets produced by the pelletizer (L) to a side extruder; and
      mixing the pellets produced by the pelletizer (L) with the vinyl aromatic polymer, the expandable agent, and optionally the additives prior to introducing the vinyl aromatic polymer, the expandable agent, and optionally the additives into the pelletizer (S).

2. The method of claim 1, wherein the pellets produced in the pelletizer (L) do not meet production requirements of the expandable vinyl aromatic polymer pellets that are produced in the pelletizer (S).

3. The method of claim 2, wherein the pellets produced in the pelletizer (L) comprise crystal polystyrene or high impact polystyrene.

4. The method of claim 1, wherein the diameter of the plurality of holes of small diameter ranges from 0.5 mm to 1.9 mm.

5. The method of claim 1, wherein the diameter of the plurality of holes of large diameter ranges from 2 mm to 5 mm.

6. The method of claim 1, further comprising, while the pelletizer (S) produces the expandable vinyl aromatic polymer pellets, introducing the vinyl aromatic polymer without the expandable agent to the pelletizer (L) and producing a non expandable vinyl aromatic polymer using the pelletizer (L).

7. The method of claim 1, further comprising, while the pelletizer (S) produces the expandable vinyl aromatic polymer pellets, performing the following steps:
   removing the first die plate of the pelletizer (L) and replacing the first die plate of the pelletizer (L) with a third die plate having a plurality of holes of small diameter, thereby converting the pelletizer (L) into an established pelletizer (S); and
   producing additional expandable vinyl aromatic polymer pellets in the established pelletizer (S).

8. The method of claim 7, wherein the established pelletizer (S) is used to produce the additional expandable vinyl aromatic polymer pellets during maintenance of the pelletizer (S).

9. The method of claim 1, further comprising switching the introduction of the vinyl aromatic polymer, the expandable agent, and optionally the additives from the pelletizer (S) back to the pelletizer (L).

10. The method of claim 9, further comprising switching the introduction of the vinyl aromatic polymer, the expandable agent, and optionally the additives from the pelletizer (L) back to the pelletizer (S).

11. The method of claim 9, wherein the switching of the introduction of the vinyl aromatic polymer, the expandable agent, and optionally the additives from the pelletizer (S) back to the pelletizer (L) occurs: when production requirements for production of the expandable vinyl aromatic polymer pellets in the pelletizer (S) are not met, when maintenance of the pelletizer (S) is required, or when the production requirements for production of the expandable vinyl aromatic polymer pellets in the pelletizer (S) are changed.

12. The method of claim 1, further comprising incorporating flame retardant into the pellets produced with the pelletizer (L).

13. A method for production of expandable vinyl aromatic polymer pellets and non expandable vinyl aromatic polymer comprising:

during start-up of the production of the expandable vinyl aromatic polymer pellets:

introducing a vinyl aromatic polymer, an expandable agent, and optionally additives to a pelletizer (L) comprising a first die plate having a plurality of holes of large diameter and a first cutting means; and producing pellets in the pelletizer (L) until a polymer flow rate is in an operating range of a pelletizer (S);

when the polymer flow rate is in the operating range of the pelletizer (S), switching the introduction of the vinyl aromatic polymer, the expandable agent, and optionally the additives from the pelletizer (L) to the pelletizer (S), and operating the pelletizer (S) at conditions effective to produce the expandable vinyl aromatic polymer pellets, wherein the pelletizer (S) comprises a second die plate having a plurality of holes of small diameter and a second cutting means;

recovering the expandable vinyl aromatic polymer pellets from the pelletizer (S);

recovering the pellets from the pelletizer (L);

while the pelletizer (S) produces the expandable vinyl aromatic polymer pellets, introducing the vinyl aromatic polymer without the expandable agent to the pelletizer (L) and producing a non expandable vinyl aromatic polymer using the pelletizer (L), wherein the pelletizer (L) is fed the vinyl aromatic polymer without the expandable agent from a devolatizer of a polymerization unit.

* * * * *